US009636983B2

(12) United States Patent
Hindman

(10) Patent No.: US 9,636,983 B2
(45) Date of Patent: May 2, 2017

(54) PNEUMATIC DOOR SEAL

(71) Applicant: Hyundai Translead, San Diego, CA (US)

(72) Inventor: Donald James Hindman, San Diego, CA (US)

(73) Assignee: Hyundai Translead, San Diego, CA (US)

( * ) Notice: Subject to any disclaimer, the term of this patent is extended or adjusted under 35 U.S.C. 154(b) by 0 days.

(21) Appl. No.: 14/543,654

(22) Filed: Nov. 17, 2014

(65) Prior Publication Data

US 2015/0068686 A1 Mar. 12, 2015

Related U.S. Application Data

(63) Continuation-in-part of application No. 13/587,566, filed on Aug. 16, 2012, now abandoned.

(60) Provisional application No. 61/562,292, filed on Nov. 21, 2011.

(51) Int. Cl.

| | |
|---|---|
| ***B60J 5/10*** | (2006.01) |
| ***B60J 10/00*** | (2016.01) |
| ***E06B 7/23*** | (2006.01) |
| ***B60J 5/14*** | (2006.01) |
| ***B60J 10/244*** | (2016.01) |
| ***B60J 10/84*** | (2016.01) |

(52) U.S. Cl.

CPC ............ *B60J 10/0037* (2013.01); *B60J 5/14* (2013.01); *B60J 10/244* (2016.02); *B60J 10/84* (2016.02); *E06B 7/2318* (2013.01)

(58) Field of Classification Search

CPC ........................................................ B60J 5/108

USPC ........................................ 296/146.8; 160/238

See application file for complete search history.

(56) References Cited

U.S. PATENT DOCUMENTS

| | | | | |
|---|---|---|---|---|
| 2,469,131 | A * | 5/1949 | Ross | B60J 10/244 49/477.1 |
| 3,747,275 | A * | 7/1973 | May | B61D 19/001 49/477.1 |
| 4,366,977 | A * | 1/1983 | Davis | B60P 7/14 296/24.41 |
| 4,441,278 | A * | 4/1984 | Covey, III | E06B 7/2318 49/477.1 |
| 4,761,917 | A | 8/1988 | Knecht et al. | |
| 5,141,280 | A | 8/1992 | Gerrard | |
| 6,098,696 | A | 8/2000 | Styra et al. | |
| 6,922,945 | B2 * | 8/2005 | Dron | F16J 15/46 49/475.1 |
| 7,984,794 | B2 | 7/2011 | Kuipers et al. | |
| 8,146,985 | B2 | 4/2012 | Nelson | |

(Continued)

*Primary Examiner* — H Gutman

(74) *Attorney, Agent, or Firm* — Procopio, Cory, Hargreaves & Savitch LLP

(57) ABSTRACT

A roll-up door assembly including a plurality of door panels; a pneumatic seal apparatus having an elastic membrane of an elongated tube disposed around a perimeter of the trailer door so as to be adjacent to the plurality of door panels, wherein pressurized air is injected into the pneumatic seal apparatus to expand the elastic membrane and to apply an outward force against multiple sides of the plurality of door panels, wherein applying the outward force against the plurality of door panels on multiple sides keeps the plurality of door panels as a single unit such that substantially less air flows through the plurality of door panels than prior to the application of the outward force to seal the trailer door.

7 Claims, 6 Drawing Sheets

(56) References Cited

U.S. PATENT DOCUMENTS

| | | | | |
|---|---|---|---|---|
| 8,528,622 | B2 | 9/2013 | Ehrlich | |
| 2005/0127315 | A1* | 6/2005 | Hollingsworth et al. | 251/129.04 |
| 2005/0161172 | A1 | 7/2005 | Rekret | |
| 2011/0018205 | A1 | 1/2011 | Nelson | |
| 2011/0107674 | A1 | 5/2011 | Sauter | |
| 2011/0258934 | A1 | 10/2011 | Gaviglia | |
| 2011/0290431 | A1 | 12/2011 | Ehrlich | |
| 2012/0023829 | A1 | 2/2012 | Happel et al. | |
| 2013/0306656 | A1* | 11/2013 | Eckhoff et al. | 220/592.26 |

* cited by examiner

PNEUMATIC DOOR SEAL

CROSS-REFERENCE TO RELATED APPLICATIONS

This application is a continuation-in-part application of co-pending U.S. patent application Ser. No. 13/587,566, filed Aug. 16, 2012, entitled "Pneumatic Door Seal Systems and Methods," which claimed priority to U.S. Provisional Patent Application No. 61/562,292, filed Nov. 21, 2011. The disclosures of the above-referenced applications are incorporated herein by reference.

BACKGROUND

Field of the Invention

The present disclosure relates to pneumatic door seal systems, apparatus and methods.

Background

Within the last few years the conservation of energy and corresponding reduction in air pollution as a result of heavy duty diesel powered trucks and refrigerated trailers has been a major topic. Many jurisdictions currently require reductions in energy use and air pollution by trucks and trailers relating to tractor idling as well as operation of diesel powered refrigeration units when being loaded, unloaded, or in standby mode at warehouses, loading docks, stores, and other general parking areas.

One important area for efficiency gains is the sealing capability of roll-up type doors on refrigerated trailers. By nature of construction, these devices need to have a space or clearance between segments of the door, i.e., door panels, and have relatively low resistance at the perimeter for them to operate properly. These roll-up type doors are less efficient from a BTU retention standpoint than swing-type doors. Additionally, forces created by the refrigeration unit push air against the door as it is used as a "bulkhead" to stop air and can create cause separate between the panels. Externally, a low pressure condition is created when the trailer is running down the road directly behind the trailer and in front of the door assisting in creating air loss at the joints of the door.

In current roll-up doors, the perimeter only has a passive seal, which can easily be displaced by the pressure exerted by the air flow from the refrigeration unit. Thus, there is a need for seal apparatus that can actively and effectively seal roll-up doors. There is a further need for seal apparatus and methods to effectively seal roll-up door assemblies on trailers. There also remains a need for a seal apparatus that can actively and effectively seal roll-up doors and can be integrated and used with trailers, particularly refrigerated trailers.

SUMMARY

The present invention provides for top lifting of trailers.

The present disclosure, in its many embodiments, alleviates to a great extent the disadvantages of known door seals by providing an elastic membrane that expands when pressurized air is introduced into it for the purposes of creating a seal and/or applying pressure preventing movement of the door panels. The design is such that the deployment of the seal aids in keeping the panels from separating. Thus, in the case of a refrigerated trailer, embodiments improve thermal capacity, and in the case of a dry van, improve the door's ability to prevent water ingress at all joints. The seal may be deployed by a manual or electrically-manipulated valve.

Further it can also be automatically deployed using the supply line available on trailers equipped with air brakes. The membrane could be deployed on equipment without supply air available by providing a separate air supply source not intended for braking purposes.

In exemplary embodiments, a door sealing system comprises a roll-up door assembly and a pneumatic seal apparatus. The roll-up door assembly includes at least one door panel. The at least one door panel may comprise a plurality of door panels. The pneumatic seal apparatus is located adjacent the at least one door panel and includes an elastic membrane defining a channel therethrough and a base member fixedly attached to the elastic membrane via a neck portion. The pneumatic seal apparatus may comprise a header seal, a pneumatic gasket, and a door post seal, which may be integrally formed or three separate portions. The elastic membrane, the base member, and the neck portion may be integrally formed. The elastic membrane may be made of one or more of: fluoroelastomer, polyether urethane, styrene butadiene, epichlorohydrin, EPDM, silicone, butyl, nitrile, neoprene, or natural rubber.

The elastic membrane is expandable by injection of pressurized air such that an expanded membrane applies outward force against the door panel to seal the roll-up door assembly. The system may further comprise a valve to regulate the flow of pressurized air into the channel. In exemplary embodiments, the pressurized air is supplied from a trailer supply line. The trailer supply line may be fluidly connected to a brake release. The pressurized air may be supplied from a trailer air reservoir via a regulator, and the air may be pressurized by a refrigeration unit.

Exemplary embodiments include a sealing system for a trailer door, comprising a trailer and a pneumatic seal apparatus. The trailer has an air supply line and a roll-up door assembly, and the roll-up door assembly includes at least one door panel. The door panel may comprise a plurality of door panels. The trailer supply line may be fluidly connected to a brake release. The sealing system may further comprise a refrigeration unit fluidly connected to the trailer supply line wherein the air is pressurized by the refrigeration unit. The pneumatic seal apparatus is located adjacent the at least one door panel and includes an elastic membrane defining a channel therethrough and a base member fixedly attached to the elastic membrane via a neck portion. The pneumatic seal apparatus may comprise a header seal, a pneumatic gasket, and a door post seal, which may be integrally formed or three separate portions. The elastic membrane, the base member, and the neck portion may be integrally formed. The elastic membrane is expandable by injection of air pressurized by the refrigeration unit, the air traveling to the channel via the air supply line such that an expanded membrane applies outward force against the door panel to seal the roll-up door assembly. The pressurized air may be supplied from a trailer air reservoir via a regulator.

Exemplary embodiments include method of sealing a trailer door comprising injecting pressurized air into a pneumatic seal apparatus. The pneumatic seal apparatus is located adjacent to all panels and has an elastic membrane or tube there through such an expanded membrane applies outward force to the door panels causing the door panels to lock into place. The methods may further comprise pressurizing the air using a refrigeration unit. Exemplary methods further comprise supplying the air from a trailer air reservoir via a regulator. The methods may further comprise supply air via a trailer supply line and the trailer supply line may be fluidly connected to a brake release. The methods further comprise regulating flow of pressurized air into the elastic conduit or tube using a valve.

Accordingly, it is seen that pneumatic sealing systems, apparatus and methods are provided that improve the sealing and thermal efficiencies of roll up doors, provide and reduce damage to rollers, hinges and hardware associated with vibration and travel over the road by clamping all panels in place. Further, by clamping the panels in place to the door frame, the panels lend support to the overall frame as an anti-racking mechanism.

Other features and advantages of the present invention should be apparent from the present description which illustrates, by way of example, aspects of the invention.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
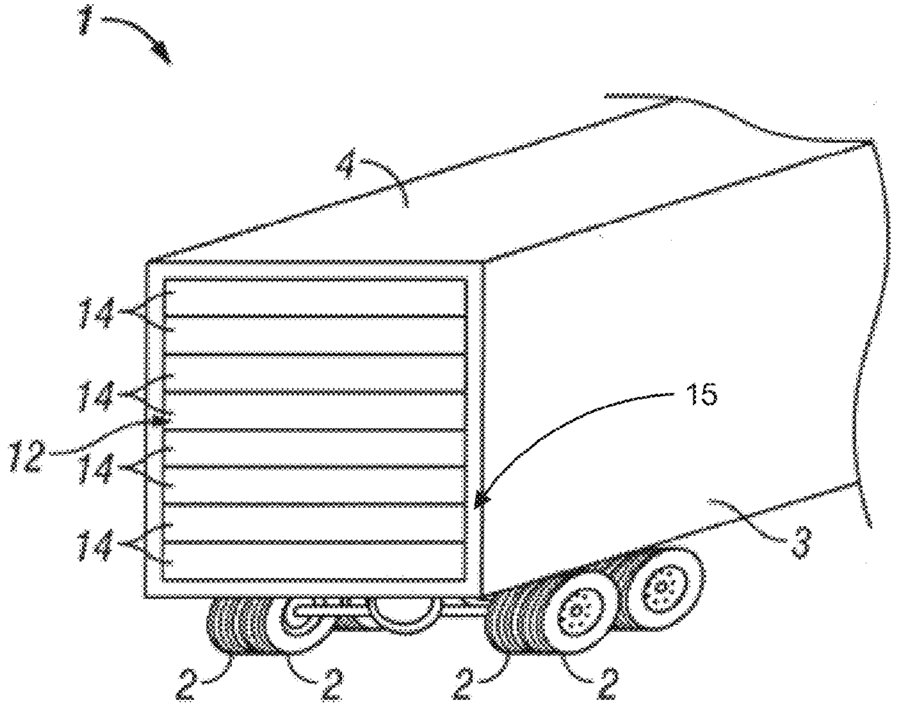
FIG. 1 is a perspective view of an embodiment of a trailer in accordance with the present disclosure.
Figure 2:
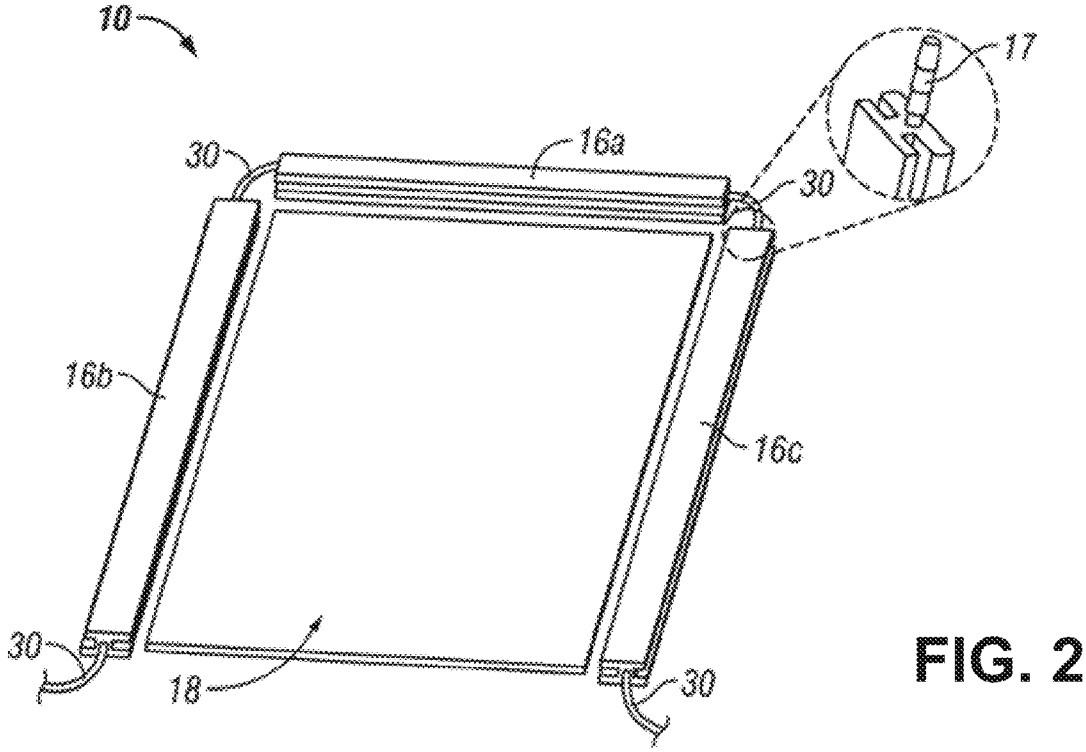
FIG. 2 is a perspective view of an embodiment of a sealing system in accordance with the present disclosure.
Figure 3:
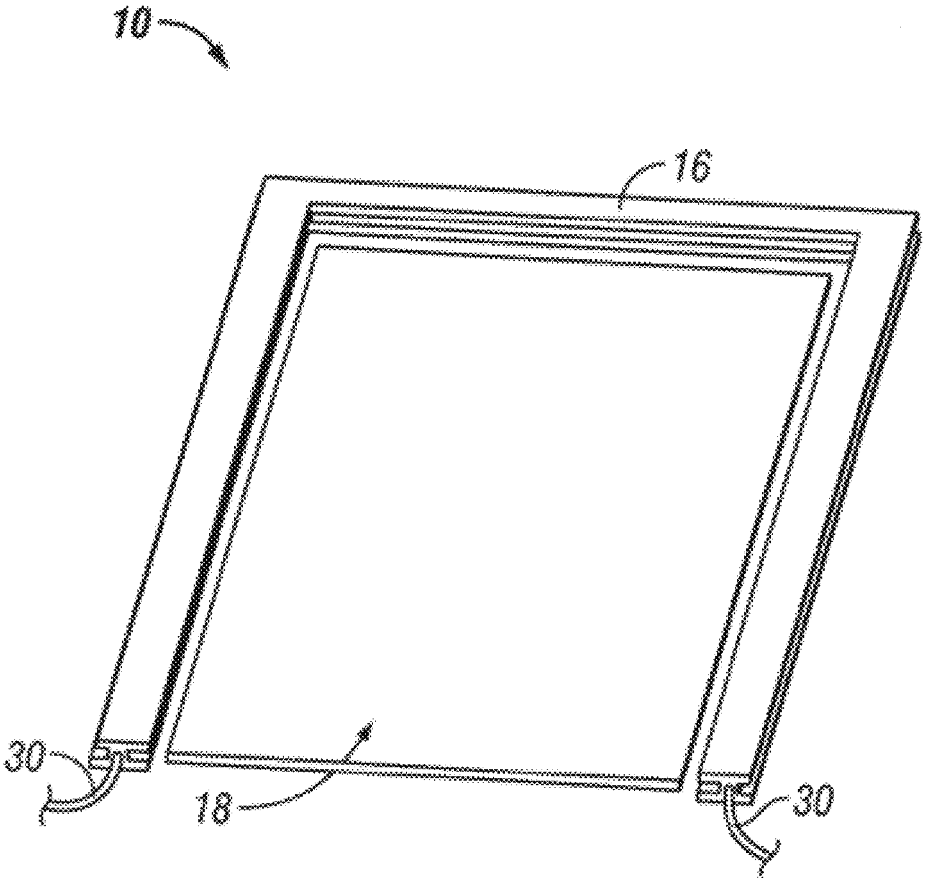
FIG. 3 is a perspective view of an embodiment of a sealing system in accordance with the present disclosure.
Figure 4:
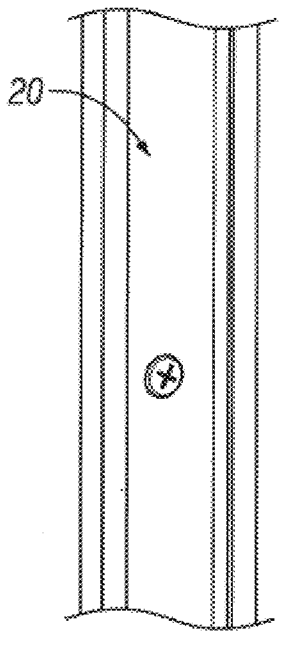
FIG. 4 is a perspective view of an embodiment of a seal track in accordance with the present disclosure.

Referring to FIGS. 1-4, a trailer 1, commonly referred to as a semi-trailer or van, has wheels 2, side walls 3, a roof 4, and a roll-up door assembly 12 that includes at least one door panel 14. The roll-up door assembly 12 typically has space or clearance between the panels 14, or segments, of the door assembly. Inside views of the trailer 1, as in FIGS. 2 and 3, illustrate pneumatic seal apparatus 16.

Pneumatic seal apparatus 16 is arranged around the perimeter of trailer roll doors 18 so as to be adjacent to all door panels 14 and, in exemplary embodiments, adjacent the full roll-up door assembly 12. More particularly, pneumatic seal apparatus 16 is disposed in seal track 20, which extends around the perimeter of trailer doorway 18 and is sized to receive the seal apparatus 16.

The pneumatic seal apparatus 16 can be configured as a three-piece design, as shown in FIG. 2, or as a single-piece design joined together at corners, as shown in FIG. 3. An embodiment of a three piece design of pneumatic seal apparatus 16 comprises of header seal 16*a* and door post seals 16*b*, 16*c*. A pneumatic gasket 17 is intended to clamp door panels in place to prevent them from moving thus creating a capture point whereby gaps between door panels are eliminated and the door sections clamped against their rolling track. The activation is provided for in one case by releasing the parking brake supplying air to the trailer and charging the seal through regulated means 16.

Figure 5A:
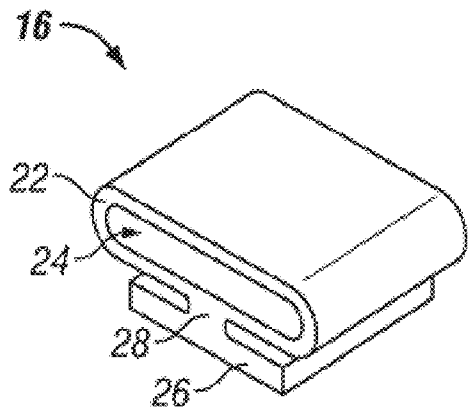
FIG. 5A is a perspective view of an embodiment of a pneumatic seal apparatus in accordance with the present disclosure.
Figure 5B:
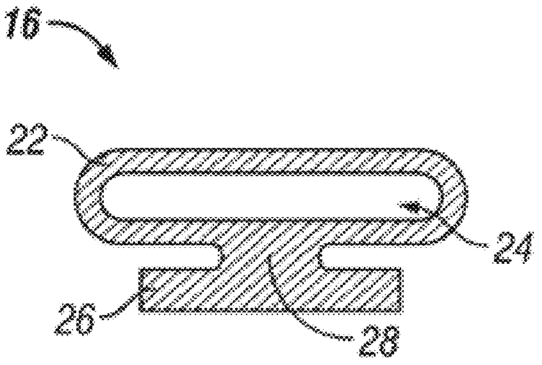
FIG. 5B is a cross-sectional view of the pneumatic seal apparatus of FIG. 5A.

Exemplary embodiments of a pneumatic seal apparatus 16 are shown in more detail in FIGS. 5A and 5B. Pneumatic seal apparatus 16 includes an elastic membrane 22 defining a conduit or tube 24 therethrough. As discussed in more detail herein, the elastic membrane 22 expands when the conduit or tube 24 receives pressurized air. The elastic membrane 22 may be made of any lightweight, strong, elastic material including fluoroeleatomer, polyether urethane, styrene butadiene, epichlorohydrin, EPDM, silicone, butyl, nitrile, neoprene, natural rubber or any combination of such materials. In exemplary embodiments, the pneumatic seal includes a base member 26, which is sized to fit into seal track 20. A neck portion 28 may be located between elastic membrane 22 and base member 26 and my connect the elastic membrane 22 to base member 26. It should be noted that a variety of different pneumatic seal arrangements could be used so long as an elastic, expandable material defines a conduit or tube for injection of air. Additionally it must be noted, the expandable tube applies pressure to multiple panels in order to join them for the purposes of the multiple panels to now act as one.

Figure 6:
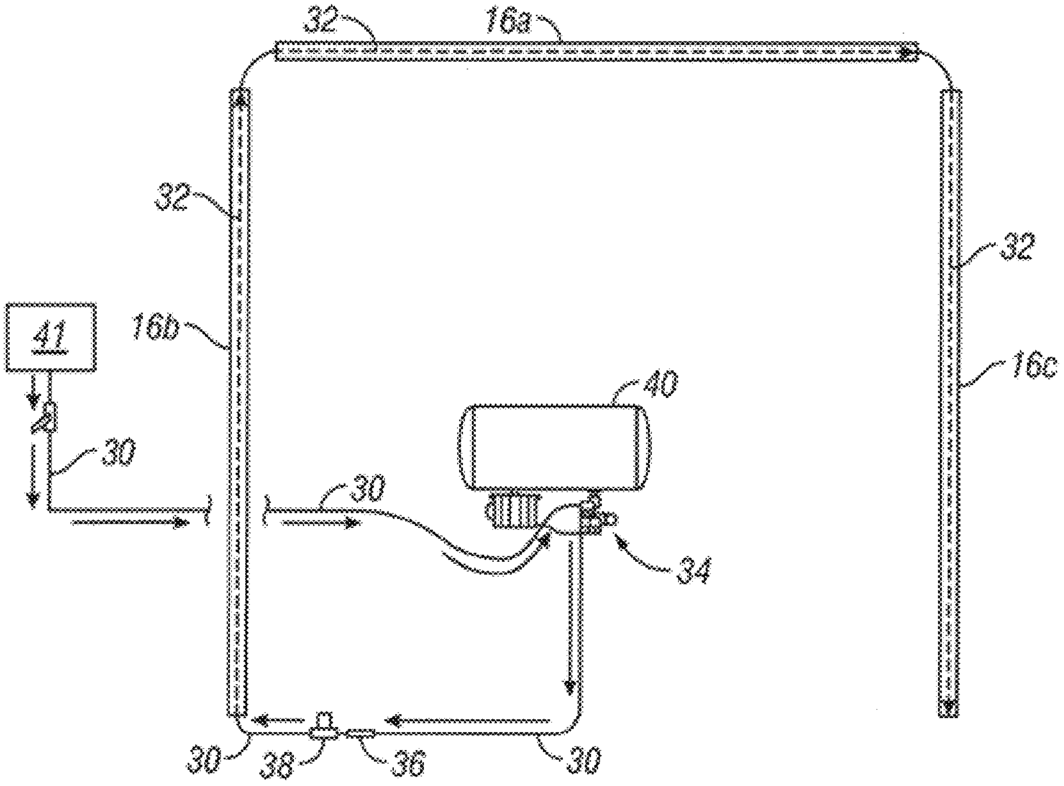
FIG. 6 is a schematic view of an embodiment of a sealing system in accordance with the present disclosure.

In exemplary embodiments, the pneumatic seal apparatus 16 of door sealing system 10 receives air 32 from the trailer's air supply line 30. The trailer supply line 30 may be fluidly connected to the trailer parking brake release 34 such that air 32 from the supply line 30 joins the trailer supply line system at the brake release 34. The supply line 30 is coupled to activator/pressure protection valve 36 and regulator 38. Ultimately, the supply line 30 is fluidly connected to the pneumatic seal apparatus 16. An example of this embodiment is illustrated in FIG. 6.

In a further embodiment with respect to FIGS. 1 through 6, the pneumatic seal apparatus 16 is configured as an elastic membrane of an elongated tube 22 disposed around a perimeter of the roll-up door assembly 12 so as to be adjacent to the door panels 14. The pressurized air is injected into the pneumatic seal apparatus 16 to expand the elastic membrane of the elongated tube 22 and to apply an outward force against multiple sides of the door panels 14. Applying the distributed outward force against the door panels 14 on multiple sides keeps the door panels as a single unit such that substantially less air flows through the door panels than prior to the application of the outward force to seal the roll-up door assembly 12. That is, the application of the distributed pressure between the roll door panels 14 and the door frame creates a supporting structure to the door frame. Further, the application of the distributed pressure between the door panels 14 and the frame 15 reduces or eliminates the resonance from the door when operated over the road, reducing or eliminating stress to the rollers, hardware and hinges holding the roll-up door panels 14 in place.

Figure 7:
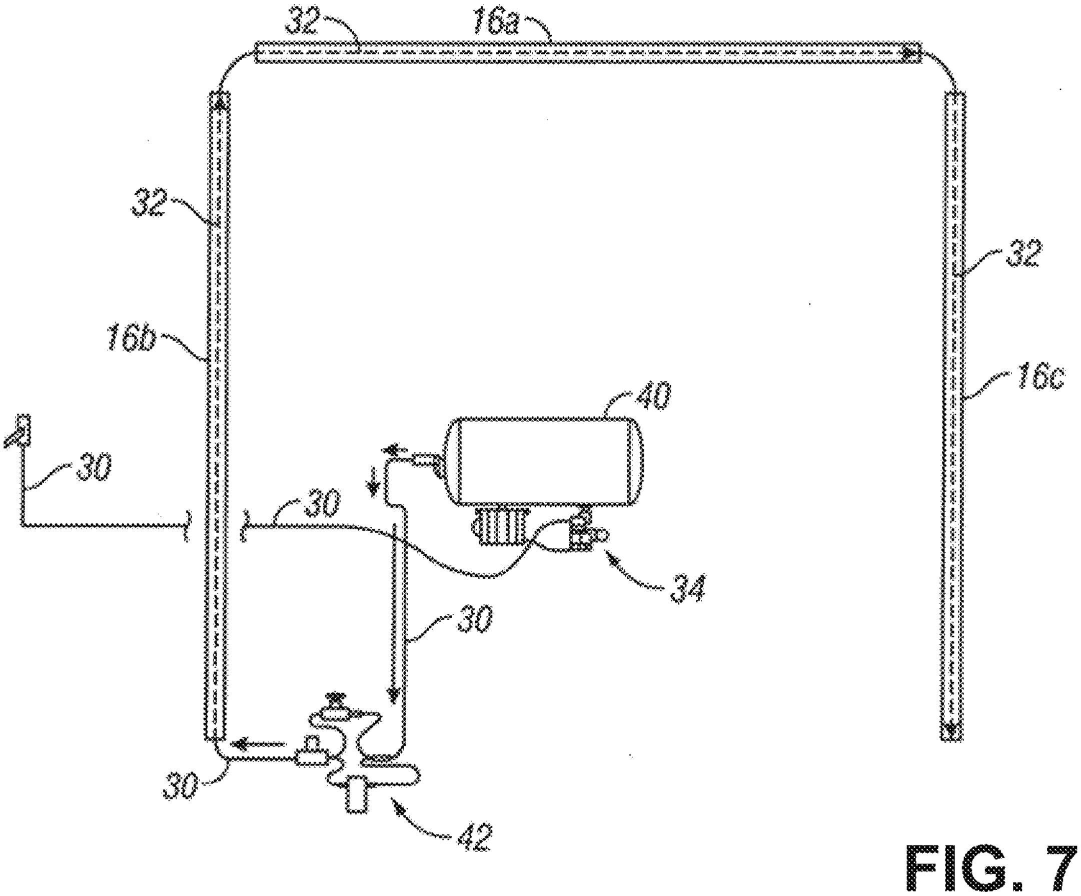
FIG. 7 is a schematic view of an embodiment of a sealing system in accordance with the present disclosure.

Another exemplary embodiment, shown in FIG. 7, supplies air 32 to the pneumatic seal apparatus from the trailer's air reservoir 40, which receives air from an external air supply 41. A supply line 30 is fluidly connected to the air reservoir 40 and extends to control valve 42 and then regulator 38, which serves to regulate the pressure of air 32. Regulator 38 may be configured to allow air flow at a preset pressure or within a preset range and automatically cut off the flow of air 32 if the pressure outside the preset range. Ultimately, the supply line 30 is fluidly connected to the pneumatic seal apparatus 16. It should be noted that the control valve 42 could be manually operated or automatically controlled electrically, e.g., and electric solenoid valve, or via wireless communication. The trailer's refrigeration unit 44 could be electrically connected to the solenoid to operate the seal's supply air thus working in unison with the refrigeration cycles. In operation, the first user closes the roll-up door assembly 12, which may be accomplished by moving the door assembly 12, downward in door track 13, the door track 13, optionally engaged by rollers 21, mounted to the door via roller mounts 23 mounting the roller axle posts 25 (see FIG. 8). The air 32 originates either from an air source 41 external to the trailer 1 or from the trailer's air reservoir 40. The air 32 travels through the trailer supply line 30 and may pass through the trailer parking brake release mechanism 34. From the brake release 34, the air 32, passes through pressure protection valve 36 and regulator 40 to the pneumatic seal apparatus 16. This could be an automatic process. Alternatively, in a manual process, the air 32 originating from the air reservoir 40 could bypass the brake release 34 and pass through the control valve 42 and to regulator to the pneumatic seal apparatus 16.

Figure 8:
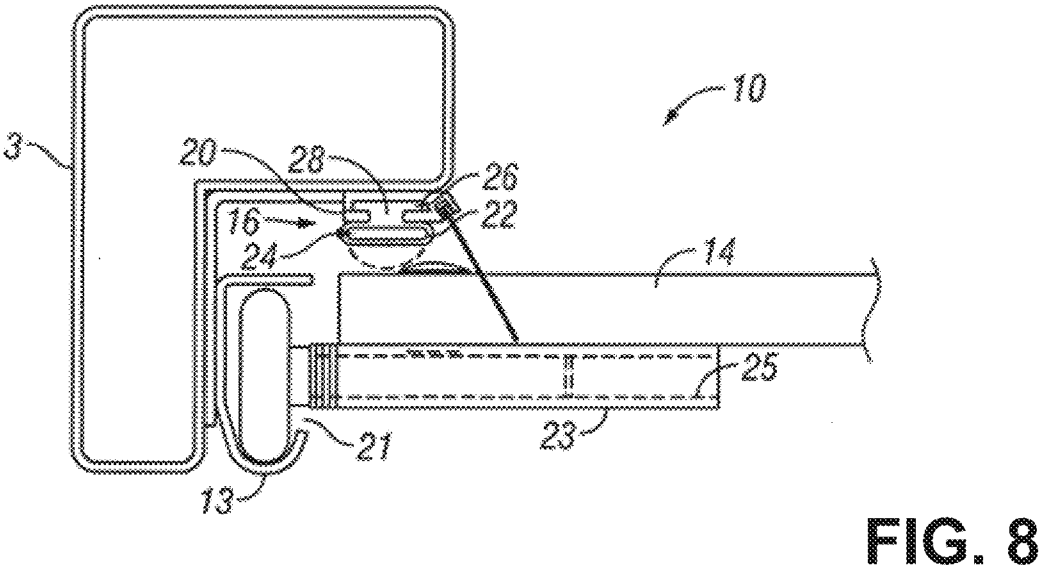
FIG. 8 is a cross-sectional view of an embodiment of a sealing system in accordance with the present disclosure.
Figure 9A:
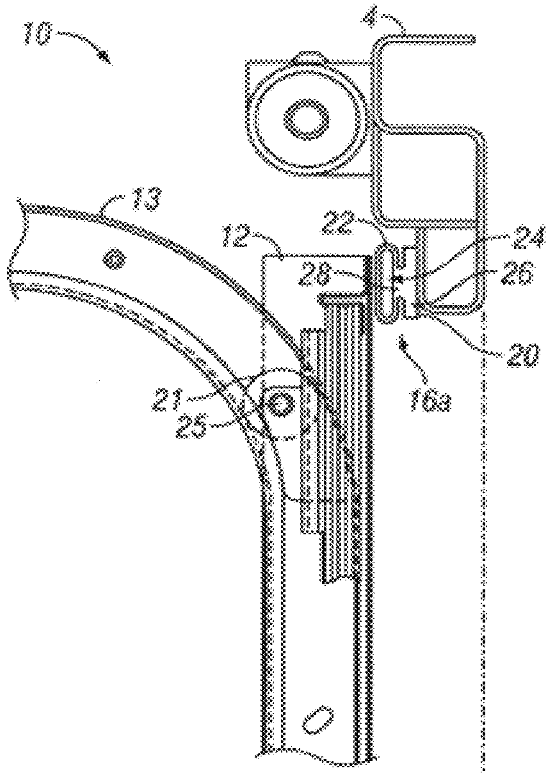
FIG. 9A is a cross-sectional view of an embodiment of a sealing system in accordance with the present disclosure.
Figure 9B:
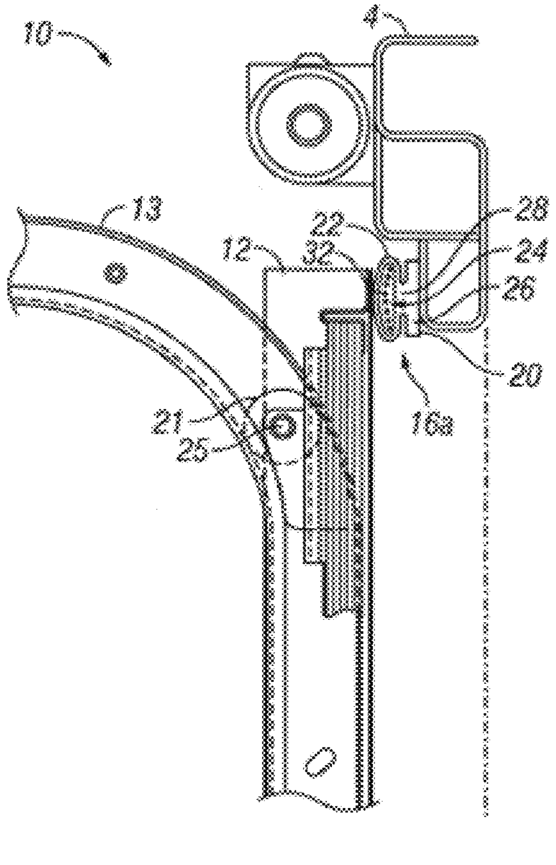
FIG. 9B is a cross-sectional view of an embodiment of a sealing system in accordance with the present disclosure.

When the air 32 enters the pneumatic seal apparatus 16 it fills the conduit (tube) 24. As best seen in FIGS. 8, 9A, and 9*b* this causes to the elastic membrane 22 of the seal apparatus 16 to expand. The expanded membrane 22 applies outward force against the panel(s) 14 of the roll door assembly 12. The outward pressure provides a seal to the roll-up door assembly 12 and prevents movement of the panels causing then to press against each other locking them into place as one continuous wall. As a result the door is tightly shut and behaves as part of the roll door frame creating a rigid and supporting structure to the door frame.

To unseal the pneumatic seal apparatus 16 and open the door assembly 12, control valve 42 may be automatically shut to stop the flow of air 32 to the pneumatic seal apparatus. Alternatively, the user could manually shut pressure protection valve 36 to stop the flow of air 32. With the air flow shut off, as the air 32 exits door post seal 16*c* it is not replaced with additional air flow. This causes channel 24 to empty and the elastic membrane 22 to contract, removing outward pressure on the roll-up door assembly 12. The panels 14 can now move and the door assembly 12 can be opened.

Figure 10:
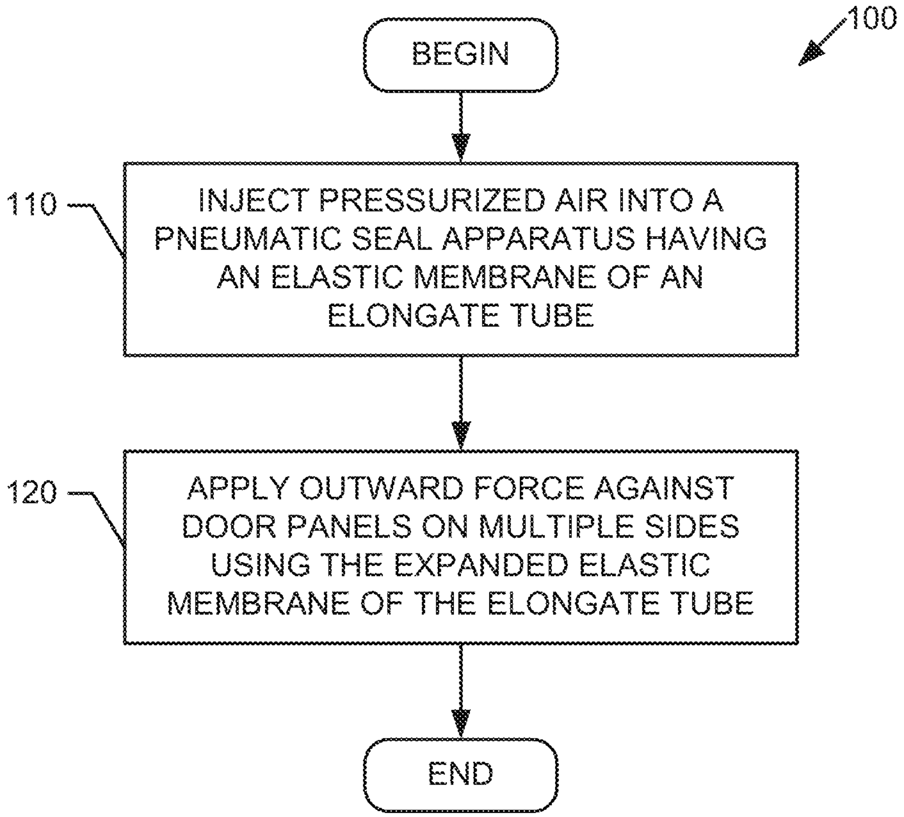
FIG. 10 is a flow diagram illustrating a method 100 of sealing a trailer door in accordance with one embodiment of the present disclosure.

FIG. 10 is a flow diagram illustrating a method 100 of sealing a trailer door in accordance with one embodiment of the present disclosure. The method 100 includes injecting pressurized air into a pneumatic seal apparatus having an elastic membrane, at step 110. Injecting the pressurized air into the pneumatic seal apparatus expands the elastic membrane. An outward force is applied, at step 120, by the expanded elastic membrane of the pneumatic seal apparatus against door panels on multiple sides. In one embodiment, the elastic membrane is configured as an elongate tube. In this embodiment, applying the outward force against the door panels on multiple sides keeps the panels as a single unit such that substantially less air flows through the door panels to seal the trailer door.

Thus, it is seen that pneumatic sealing systems and methods are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

The invention claimed is:

1. A sealing system for a trailer door, comprising:

a trailer having an air supply line and a roll-up door assembly including a plurality of door panels, wherein the air supply line is fluidly connected to a brake release;

a pneumatic seal apparatus disposed on a perimeter of the trailer door so as to be adjacent to the plurality of door panels, the pneumatic seal apparatus having a header seal and door post seals, each having an elastic membrane, wherein each of the door post seals is fluidly connected to the header seal by a supply line;

wherein pressurized air is injected into the pneumatic seal apparatus to expand the elastic membrane of the header seal and the door post seals to apply an outward force against multiple sides of the plurality of door panels, wherein the header seal and the door post seals are each located on a different side of the plurality of door panels, wherein applying the outward force against the plurality of door panels on multiple sides creates a single rigid structure such that substantially less air flows through the plurality of door panels than prior to the application of the outward force to seal the trailer door.

2. The system of claim 1, wherein the pneumatic seal apparatus further comprises a base member and a neck portion, and wherein the elastic membrane, the base member, and the neck portion are integrally formed.

3. The system of claim 1, wherein the air supply line is a trailer supply line.

4. A method of sealing a trailer door, comprising:

injecting pressurized air into a pneumatic seal apparatus having a header seal and door post seals, each having an elastic membrane, wherein each of the door post seals is fluidly coupled to the header seal by a supply line, wherein injecting the pressurized air into the pneumatic seal apparatus expands each of the elastic membranes;

applying an outward force by the expanded elastic membranes of the pneumatic seal apparatus against a plurality of door panels on multiple sides, wherein the header seal and the door post seals are each located on a different side of the plurality of door panels, wherein applying the outward force against the plurality of door panels on multiple sides creates a single rigid structure such that substantially less air flows through the plurality of door panels to seal the trailer door; and pressurizing air using a refrigeration unit.

5. The method of claim 4, further comprising supplying air via a trailer supply line.

6. The method of claim 5, wherein the trailer supply line is fluidly connected to a brake release.

7. A sealing system for a trailer having an air supply line, the sealing system comprising:

a roll-up door assembly including a plurality of door panels;

a pneumatic seal apparatus disposed on a perimeter of the trailer door so as to be adjacent to the plurality of door panels, the pneumatic seal apparatus having a header seal and door post seals, each having an elastic membrane, wherein each of the door post seals is fluidly connected to the header seal by a supply line;

wherein pressurized air is injected into the pneumatic seal apparatus to expand the elastic membrane of the header seal and the door post seals to apply an outward force against multiple sides of the plurality of door panels, wherein the header seal and the door post seals are each located on a different side of the plurality of door panels, wherein applying the outward force against the plurality of door panels on multiple sides creates a single rigid structure such that substantially less air flows through the plurality of door panels than prior to the application of the outward force to seal the trailer door; and a control valve regulating flow of pressurized air into the pneumatic seal apparatus, wherein the control valve is an electric solenoid valve electrically connected to a refrigeration unit, the refrigeration unit operable to control the control valve.

* * * * *